United States Patent [19]

Rouillard nee Bauer et al.

[11] Patent Number: 4,568,526

[45] Date of Patent: * Feb. 4, 1986

[54] PROCESS FOR SELECTIVE LIQUID-LIQUID EXTRACTION OF GERMANIUM

[75] Inventors: Denise Rouillard nee Bauer, Le Raincy; Gérard Cote, Antony, both of France; Paolo Fossi, Elancourt, Italy; Bruno Marchon, Paris, France

[73] Assignee: Societe Miniere et Metallurgique de Penarroya, Paris, France

[*] Notice: The portion of the term of this patent subsequent to Jun. 21, 2000 has been disclaimed.

[21] Appl. No.: 336,608

[22] Filed: Jan. 4, 1982

Related U.S. Application Data

[63] Continuation-in-part of Ser. No. 178,583, Aug. 15, 1980, Pat. No. 4,389,379.

[51] Int. Cl.$^4$ ............................................. C01G 17/00
[52] U.S. Cl. ........................................ 423/89; 423/87; 423/99; 423/139
[58] Field of Search ...................... 423/89, 87, 99, 139

[56] References Cited

U.S. PATENT DOCUMENTS 3,637,711  1/1972  Budde et al. ............... 423/DIG. 14
3,883,634  5/1975  DeSchepper et al. ................ 423/89

FOREIGN PATENT DOCUMENTS 1061574  9/1979  Canada .......................... 75/101 BE

OTHER PUBLICATIONS

Cote et al., "Liquid-Liquid Extraction of Germanium with Oxine Derivatives", *Hydrometallurgy*, vol. 5 (Feb. 1980), pp. 149-160.
Marchon et al., "Some Typical Behaviours of the β-Dodecenyl-8-Hydroxyquinoline Through its Reactions with Germanium (IV)", *Journal of Inorganic and Nuclear Chemistry*, vol. 41, No. 9 (1979), pp. 1353-1363.
Rudenko et al., "Extraction Kinetics of Germanium 8-Oxyquinolinate", Vestnik Moskovskogo Universiteta, Khimiya, vol. 24, No. 4, pp. 103-106, 1969.

*Primary Examiner*—John Doll
*Assistant Examiner*—Wayne A. Langel
*Attorney, Agent, or Firm*—Fleit, Jacobson, Cohn & Price

[57] ABSTRACT

A process for selective liquid-liquid extraction of germanium from an aqueous acidic liquor containing, besides germanium, at least one other metal selected from the group which comprises cadmium, zinc, cobalt, iron, arsenic and nickel. This process includes extracting germanium from said aqueous liquor by contacting said liquor with an organic medium containing a diluent and an extractant, said diluent being immiscible with said aqueous liquor. The major part of germanium passes from said aqueous liquor to an organic phase which is subsequently submitted to a stripping step by contacting with an alkaline medium, with formation of an aqueous phase containing the major part of germanium from said aqueous liquor.

22 Claims, 3 Drawing Figures

PROCESS FOR SELECTIVE LIQUID-LIQUID EXTRACTION OF GERMANIUM

This is a continuation-in-part of application Ser. No. 178,583, filed Aug. 15, 1980, now U.S. Pat. No. 4,389,379.

FIELD OF THE INVENTION

The invention relates to extraction of metals from aqueous acidic liquors, and more particularly to a process for selective extraction of germanium from aqueous acidic liquors containing also at least one metal selected from the group which comprises cadmium, zinc, cobalt, iron, arsenic, aluminum, gallium and nickel.

BACKGROUND OF THE INVENTION

The separation of germanium from acidic leach liquors has attracted great attention because of its economic implication, especially in zinc production. The electrolysis of zinc can be achieved with a good yield only when germanium has been completely eliminated from the electrolyte. This separation is therefore a preliminary operation to the recovery of zinc metal from solutions. Moreover, the recovery of germamium from such solutions constitutes the main available source of this metal, applications of which are essential in many areas such as electronics, infrared optics, fiber optics, ionized particles detection and polymer chemistry.

The leaching treatment of minerals is performed with sulphuric acid for economic reasons and leads to liquors containing chiefly zinc sulphate (about 100 g/l), germanium (IV) (0.1–1 g/l) and other elements such as cadmium, magnesium, etc. As these metals do not interfere with the electrolysis of zinc or are easily removed, a selective separation of germanium from the acid liquor would be advantageous for isolation of this metal.

PRIOR ART

Conventional processes for separating germanium from acidic leach liquors (precipitation with tannin, distillation of GeCl$_4$, etc.) are very complicated. Consequently, liquid-liquid extraction and resin separation methods appear to be attractive and have been widely studied. Various solvents such as carbon tetrachloride, chloroform and tributylphosphate, and extractants such as long chain amines, alkylphosphoric acids, phosphinic acids, oxine, hydroxamic acids and alkylpyrocatechol as well as many resins have been proposed. However, the low capacity of most resins and extractants, their prohibitive costs and the strict separation conditions they sometimes impose, have often limited their application. The $\alpha$-hydroxyoxime coumpounds, recently introduced, appeared until recently to be the most suitable reagents from the preparative solvent extraction of germanium. Their application for industrial germanium recovery have been studied and pilot plant experiences have been carried out, as described by De Schepper, A. Hydrometallurgy, 1 (1976) 291. Though they are very interesting, these compounds still require severe conditions (e.g. very high acidity of the aqueous solution and high extractant concentration) to be efficient.

OBJECTS OF THE INVENTION

It is an object of this invention to provide a process for selective liquid-liquid extraction of germanium from aqueous acidic liquors containing at least another metal selected from the group which comprises cadmium, zinc, cobalt, iron, arsenic, aluminum, gallium and nickel.

Another object of this invention is to provide a process for selective extraction of germanium from aqueous acidic leach liquors containing zinc metal.

Another object of this invention is the selective extraction of germanium from such a liquor by contacting said liquor with an organic medium containing a particular extractant. Said organic medium may be a stationnary phase.

It is another object of this invention to provide such a process for extraction of germanium from such liquors with a yield of about 100%.

It is another object of this invention to provide a process for selective extraction of germanium from such liquors requiring only very short time for contacting said liquors with an organic medium.

It is another object of this invention to provide a process for extraction of germanium from such liquors by treating said liquors about at ambient temperature.

It is another object of this invention to separate germanium from aqueous liquors containing zinc by a low cost process.

SUMMARY OF THE INVENTION

According to the invention, a process for selective extraction of germanium from an aqueous acidic liquor containing, besides germanium, at least one other metal selectecd from the group comprising cadmium, zinc, cobalt, iron, arsenic, aluminum, gallium and nickel, includes:

extracting germanium from said aqueous liquor by contacting said liquor with an organic medium which contains a diluent and an extractant, said diluent being immiscible with said aqueous liquor, said extractant being selected from the oxine (8-hydroxy-quinoline) derivatives having a long hydrocarbon chain, said contacting step forming an aqueous phase containing the major part of said at least one other metal, and an organic phase containing the major part of germanium from said aqueous liquor, and stripping germanium from said organic phase by contacting said phase with an aqueous medium, said stripping step forming an aqueous phase containing the major part of germanium from aqueous liquor and an organic phase containing said diluent and said extractant.

According to the invention, the long hydrocarbon chain of said extractant includes at least eight carbon atoms, preferably up to sixteen carbon atoms, and has advantageously at least one ethylenical unsaturation. Preferably, said extractant is $\beta$-dodecenyl 8-hydroxyquinoline, but other positions of said chain are in the scope of the invention.

The pH of said aqueous acidic liquor is advantageously lower than 2, preferably lower than 0.5. If said aqueous liquor is not sufficiently acidic, said liquor is preferably acidified, for example, by addition of sulphuric acid. Said diluent is preferably selected from the group comprising pure and mixed aliphatic compounds and petroleum fractions and such compounds and fractions mixed with a minor proportion (5 to 20% v/v) of a polar liposoluble compound such as an alcohol or a phenol having preferably 5 to 15 carbon atoms, trialkyl phosphate (e.g. T.B.P.) and the case being the tensioactive sulfonate from 8 to 30 carbon atoms, for example, n-octanol.

Said aqueous medium used in the stripping step is preferably an alkaline medium such that the pH is greater than 10.

Said aqueous medium may be also diluted hydrofluoric acid (1 to 10% HF W/W) preferably 2 to 5%.

During the extracting step, the temperature is preferably ambient or lower, but it does not mind if the temperature reaches 80° C., and, during the stripping step, the temperature is preferably ambient or greater.

The concentration of extractant in organic medium used in the extracting step is preferably such that there are at least 4 moles of extractant for 1 mole of germanium from said aqueous acidic liquor.

Said diluent may be a resin wherein the extractant either alone or with other diluents is present in the form of a gel or the like thus forming a stationnary phase.

Other objects and features of this invention will be apparent in the following description and claims in which the principles of the invention are set forth together with details directed to those skilled in the art to enable them to practice the invention, all in connection with the best mode presently comtemplated.

DESCRIPTION OF THE PREFERRED EMBODIMENTS

Figure 1:
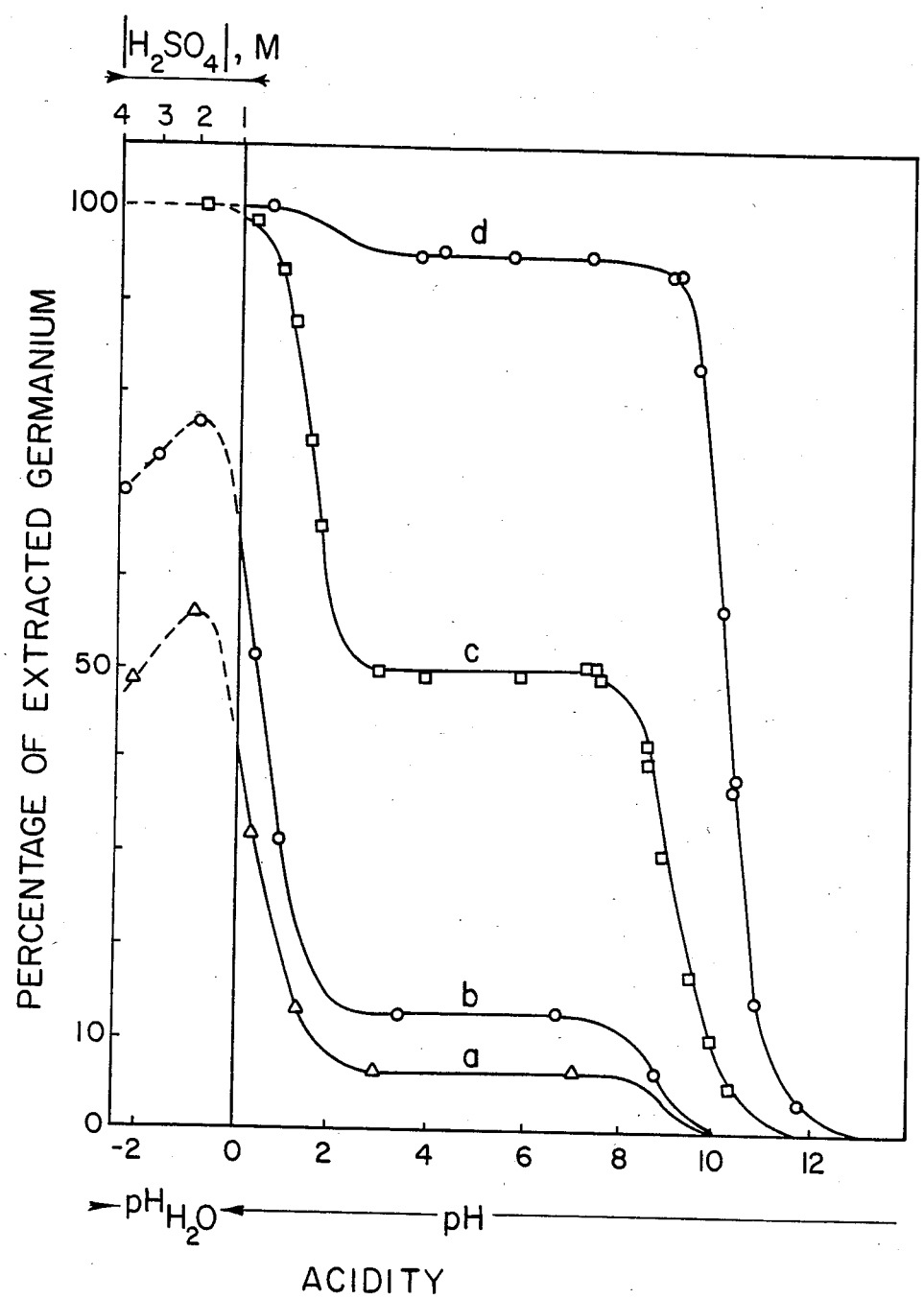
FIG. 1 is a graph illustrating the variation of germanium extracted from acidic leach liquors, according to acidity of medium.

A process according to the invention includes essentially two main steps, an extracting one and a stripping one.

The extracting step includes extracting germanium from said aqueous liquor by contacting said liquor with an organic medium which contains a diluent and an extractant. The stripping step includes stripping germanium from an organic phase formed during said extraction step, by contacting with an alkaline medium.

However, said process may include other steps. For example, if said aqueous acidic liquor is not sufficiently acidic, it is preferable to acidify said liquor, for example, by addition of sulphuric acid. However, other mineral non complexing acids well known by those skilled in the art may be used. Sulphuric acid is preferable, especially because it is very cheap and easily available, but it possesses also some advantages indicated in the following, and specially the fact that some sulphate or hydrogeno-sulphate ion is helpful for extraction.

Moreover, between extracting and stripping steps, said process includes preferably at least one scrubbing step in which the organic phase formed during said extracting step is contacted with water which removes the greatest part of the small remaining part of said other metals, for example, zinc. Such a scrubbing step removes at least partly the small proportion of $H^+$ which may be remaining in said organic phase. It has also been surprisingly observed that such a scrubbing step provides for purification of said organic phase.

The scrubbing medium is preferably water if volumes are not too important, said water being acidified by $H^+$ ($H_2SO_4$) removed during said step, or a sulphuric acid solution having a concentration between 0.1 and 0.5 N, preferably about 0.2 N. If a good impurity removing is desired it is possible to use higher sulfuric acid concentration up to 2 N.

Moreover, after the stripping step, said aqueous phase may be treated for the recovery of germanium metal or of other useful products.

One of the main features of the invention is the extractant used which is selected from the oxine derivatives having a long hydrocarbon chain. Preferably, said long chain includes at least 8 and up to 16 carbon atoms. It has advantageously by not necessarily at least one ethylenical unsaturation.

Preferably, the extractant comprises a compound of the formula $$CH_2=CH-CH(R)-\text{[quinoline-8-ol]}$$

wherein R is alkyl having 5 to 18 carbon atoms, the total carbon atoms in R being at least sufficient to ensure that the germanium chelate of said compound is soluble in hydrocarbon.

A compound very useful is 7-[3-(5,5,7,7-tetramethyl-1-octenyl)]-8-hydroxyquinone, a β7-alkenyl derivative of 8-hydroxyquinoline which has the structure:

$$CH_3-C(CH_3)_2-C(CH_3)_2-CH_3-CH(CH=CH_2)-\text{[quinoline-8-ol]}$$

Said compound is made by reacting 8-hydroxyquinoline (sodium salt) with dodecenyl chloride and distilling the resulting alkenyl ether, after pouring into water, separating and washing, the dodecenyl chloride being 1-chloro-5,5,7,7-tetramethyl-2-octene.

Other compounds very useful are 7-[3-(5,5-dimethyl-1-hexenyl)]-8-hydroxyquinoline and 7-[1-(5,5,7,7-tetramethyl-2-octenyl]-8-hydroxyquinoline.

Such compounds and their preparation are described in U.S. Pat. No. 3,637,711 to W. M. Budde and al. and in Australian Pat. No. 57,173/69 to Ashland Oil Inc.

A preferable extractant is β-dodecenyl 8-hydroxyquinoline having the formula $$C_9H_{19}-CH(CH=CH_2)-\text{[quinoline-8-ol]}$$

The following description relates essentially to detailed data where the said particular extractant, which is called "βoxH extractant" is given as example. It is commercially available as KELEX 100 from Scherex.

The influence of the acidity on the extracting step is now considered. FIG. 1 presents the percentage of extracted germanium obtained for different acidities.

The results of FIG. 1 are obtained during an extracting step in kerosene +10% of octanol with different concentrations of βoxH. Curves a, b, c and d are respectively for concentration of βoxH of $2.2 \cdot 10^{-2}$ M, $3.1 \cdot 10^{-2}$ M, $8.6 \cdot 10^{-2}$ M and 0.42 M. The concentration of germanium (IV) was $1.4 \cdot 10^{-2}$ M. The pH was obtained by addition of $H_2SO_4$, or by partial neutralization of $H_2SO_4$ by NaOH.

The examination of FIG. 1 reveals that the extraction of the germanium (IV) is not uniform inside the range of pH. In particular, extraction is the most efficient at high acidity (pH<1), though a slight decrease appears for sulphuric acid concentration higher than 2 M (curves a and b). At weak acidity and in neutral media (pH from 2 to 8), the extraction is far less efficient but it becomes independent from the pH (the pH has no influence on the extraction ratio and remains itself constant during the extraction). No extraction is observed from alkaline solutions (pH>12) at any concentration of βoxH. So, the domain of acidity can be divided in three parts corresponding to high, low and non-extraction. For the invention, the only interesting part is the high extraction one, that is for pH under 2.

The maxima of curves a and b also show that the molar amount of extracted germanium is not far from a quarter of the molar amount of βoxH present. So, to obtain the extraction of substantially all germanium, the molar amount of βoxH extractant shall be at least four times the molar concentration of germanium. In practical operations, it is preferable for the molar amount of βoxH extractant to be at least 5 to 10 times that of germanium.

In these conditions, FIG. 1 shows that 100% of germanium may be extracted according to the invention. However, the total extracted amount is not the only interesting parameter because, commercially, the rate of the reaction has a considerable importance.

The rate of extraction depends on the extractant concentration and on the germanium concentration. To determine the total rate of extraction, tests have been run with the same concentrations of βoxH extractant on the one part and of Ge (IV) on the other part, but for different pH. The βoxH extractant concentration was 200 g/l, and that of Ge (IV) was 1.0 g/l. In a first run, the pH was very acidic, because the medium contained $H_2SO_4$ 0.5 M, and in a second run, the pH was equal to 4. In the first test (with commercial Kelex and 20% of octanol), more than 50% of germanium was extracted after 2 minutes only and, in the second run, a time of more than 20 minutes was necessary for extraction of 50% of germanium. (Kelex purified by distillation gives a slower reaction rate).

These experiments show that the rather highly acidic media necessary to a high extraction percentage are also necessary for great rates of extraction.

So, the extracting step of the process according to the invention is very rapid and about quantitative, because substantially all germanium is extracted very quickly.

The particular acid used in the extracting step is a non-complexing one, for example, sulphuric acid and nitric acid. Halohydric acids and strong oxidant acids are not suitable. So, nitric acid is suitable only at a concentration at which it does not oxidize reactants (e.g. extractant). Sulphuric acid may be used at level of 25° up to 42° Bé at least.

FIG. 1 shows also that, for concentrations of βoxH equal to $2.2 \cdot 10^{-2}$ (a), $3.1 \cdot 10^{-2}$ (b), $8.6 \cdot 10^{-2}$ (c) and $4.2 \cdot 10^{-1}$ M (d), germanium is re-extracted when acidity increases from $H_2SO_4$ 2M to $H_2SO_4$ 4M. However, re-extraction is limited and the stripping step uses preferably an alkaline medium.

The influence of the concentration of βoxH extractant is now considered. It has been above-mentioned that a minimum amount of extractant was necessary for the extraction of substantially all germanium, said amount being at least 4 times and preferably at least 5 to 10 times more. However, when the concentration of βoxH is increased, the rate of extraction is also increased. That is a very trivial result which is well known by those skilled in the art.

A great advantage of the invention is to be emphasized relating to said extractant concentration. Said extractant is an expensive product, but its concentration is low; so, the physical losses of organic medium correspond to small losses of extractant. By contrast, in processes using such extractants as LIX 63 (from General Mills Inc.) which are present at very high concentrations, extractant losses are very important and costly.

The influence of diluent is now considered. In order to investigate the role of diluent on the extraction of germanium in the organic phase, experiments were performed at two different acidities of the aqueous phase: on the one hand at $H_2SO_4$ 1.5M, and on the other hand at pH=5±0.5. In all test runs, the contact time of the two phases was long enough to ensure the attainment of equilibrium. The concentrations of βoxH used were 15 g/l and 40 g/l, giving accurately measurable values of the extraction (neither too high nor too low).

The used diluents were kerosene with 10% v/v of octanol, n-octanol, a petroleum fraction containing mainly aliphatic molecules (Escaid 100) and a petroleum fraction containing mainly aromatic molecules (Solvesso 150).

The examination of the results showed a significant variation of extraction when one diluent was replaced by another. The hierarchy among the diluents was not the same for the two different acidities. At pH 5, n-octanol was the most efficient. However, at low pH (that is, in the conditions used according to the invention), the best diluent was kerosene with 10% v/v of octanol, which is slightly more favourable than the petroleum fraction containing mainly aliphatic molecules (Escaid 100).

The diluent contained a minor proportion of alcanol, preferably linear, (10% v/v) essentially because such addition prevents the formation of a third phase during the liquid-liquid extraction. However, such addition of n-alcanol having 5 to 12 carbon atoms, and more generally of a polar lipophilic dissolving agent, has another effect on reactions. In fact, such addition changes interfacial tension between aqueous and organic phases and speeds extraction which progresses essentially at the interface (as indicated by the distribution coefficient of oxH between aqueous and organic phases, said coefficient being about $10^7$).

Experiments show that the rate of extraction is slightly slowed when the temperature is increased. So, ambient or lower temperature is preferable for the extracting step.

An important aspect for commercial application is the selectivity of the separation. Literature data show that the extraction of germanium (IV) by βoxH extractant can be selective towards cadmium, zinc, cobalt and nickel, but poorly selective towards copper and iron. A quantitative evaluation of such selectivity is indicated in the following example.

An extraction step has been effectued with Kelex 100 at 10% in kerosene with 10% of octanol, at ambient temperature, with a ratio organic/aqueous of 1. The initial aqueous solution A and the aqueous phases after a first and a second extraction B and C respectively had the following concentrations in grams per liter:

|   | $H^+$ | Ge | In | Fe | Cu | Zn | As |
|---|---|---|---|---|---|---|---|
| A | 3.08 | 1.15 | 0.32 | 1.8 | 0.93 | 48 | 11 |
| B | 2.72 | 0.05 | 0.32 | 1.8 | 0.895 | 45 | 11 |
| C | 2.30 |  | 0.32 | 1.8 | 0.963 | 50 |  |

Such results show the excellent selectivity of the extracting step, even against iron. To obtain such selectivity it is necessary to be in sulphate medium (at least 1 M) allowing the formation of the assumed complex of Ge $(\beta ox)_3 HSO_4$.

The stripping step of the process according to the invention is now considered. During such step, said organic phase formed during the extraction step is contacted with an alkaline medium, said stripping step forming an aqueous phase containing the major part of germanium from said aqueous liquor, and an organic phase containing said diluent and extractant so recovered are recycled to the first extracting step.

The influence of the alkalinity on the stripping step is now considered.

The effect of the hydroxide ion concentration on the stripping of said organic phase extracted at the acidities of the industrial leaching baths is complex. When the organic phase is contacted with an alkaline aqueous solution, the overall stripping reaction forms the free $\beta oxH$ extractant in at least two steps. Firstly, $OH^-$ anions are extracted from the aqueous solution into the organic phase where they react to produce a dark red coloured compound. The coloration appears a few seconds after both phases have been brought into contact and increases in about one minute after that. Secondly, the dark colour disappears slowly by decomposition and germanium (IV) is stripped. In the first step, the higher the hydroxide ion concentration and the slower the reaction is. During the second step, the process is reversed.

Experiments show that a high pH is preferable and the aqueous alkaline solution is preferably a NaOH solution because NaOH is a strong alkaline medium, cheap and easily available. The pH of said alkaline medium is preferably greater than 10 and said alkaline medium is preferably NaOH 1 to 3.0 M. pH between 13 and 14.7 are especially advantageous.

Alkaline solutions other than NaOH also re-extract germanium during the stripping steps. Good results are obtained with $NH_4OH$ 3N and $Na_2CO_3$ 3N.

Figure 2:
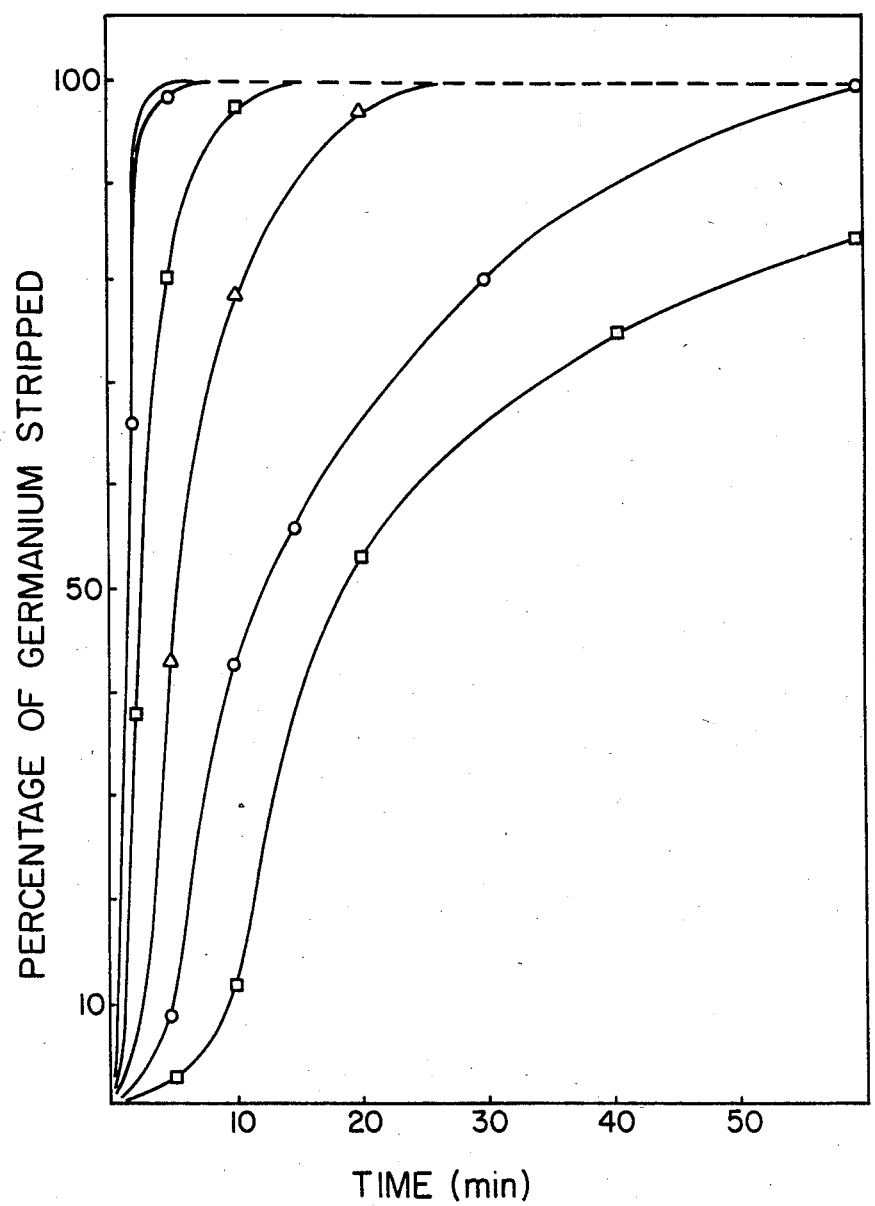
FIG. 2 is a graph illustrating the influence of the temperature on the stripping in a process according to the invention.

The influence of the temperature on the stripping of germanium is now considered, referring to FIG. 2. FIG. 2 shows curves representing variations of percentage of stripped germanium according to time. The initial germanium concentration was $9.5 \cdot 10^{-3}$ M and that of $\beta oxH$ extractant $5.0 \cdot 10^{-2}$ M. The alkaline medium was an aqueous solution of sodium hydroxide 1,2 M. Curves a, b, c, d, e and f are for temperatures of 25° C., 30° C., 40° C., 50° C., 60° C. and 70° C., respectively. FIG. 2 shows that the temperature has a great influence on the stripping step. So, it is preferable for the stripping step to be used at a temperature of at least 40° C. Such temperature may be easily obtained with waste heat. However, such heating increases the temperature of the organic phase which may be cooled before use for the extracting step.

When the temperature is at least 40° C., it is highly preferable to shake the stripping medium, because the reaction rate is then high enough to be greater than that allowed by the limited interface of the two quiet phases.

The nearly complete and easy re-extraction of germanium with alkaline solution, as NaOH 3 N, according to the invention, is a great advantage. Experiments with solutions containing 3, 5, 7, 10% and even 20% of Kelex in kerosene with 10% of octanol regularly give re-extraction ratios greater than 99%.

A continuous experiment during a long period (102 h at 70°–80° C.) in a closed loop pilot plant showed no degradation of Kelex and very small losses of such extractant.

One of the preferred and most surprizing embodiment will be described hereafter. Surprinzingly, it had been found during the studies which issued into the present patent application that the compounds called extractants and defined above can be used as stationnary phases when adsorbed in the form of a gel or the like into resins.

The extraction by resins differs from the one by liquid-liquid extraction on the followings points:

The best pH range of extraction is 0 to 2 and preferably 0.5 to 1.5 (it is to be noted that less acidity is needed than in the case of liquid-liquid extraction).

The rate of extraction is far higher even without agitation.

The distribution of $\beta oxH$ between organic phase and aqueous phase is far better when organic phase is resin, about 10 times, and consequently the concentration of Kelex in aqueous phase is lower, e.g. for 10% of $\beta oxH$ in the organic phase respectively for liquid phase and for resin the value are at pH 1 $10^{-4}$ and $10^{-5}$, at pH 7 $10^{-6.5}$ and $10^{-7.5}$ and at pH 13 $10^{-6.2}$ and $10^{-6.8}$.

The influence of polar liposoluble compounds is the same as in the liquid-liquid extraction but it is possible to reach a higher proportion of said compound up to 50% instead of up 20% (rounded figures).

The resins used were, on the one hand, the resins produced by the method described by Bayer in his patent and provided by it and, on the other hand, the resins procuded by adsorption on an inert resin skeleton. The latter method is known per se and is reminded in the example 6.

It has been found that without agitation it was possible to extract and to stripp in the same way as described for the liquid-liquid extraction the germanium present in the sulphate solution. The elution by hydrochloric acid (4 to 12 N, preferably 6 to 10 N) in the case of the resins is possible as shown in the examples.

The behaviour of extractant according to the invention presents great differences with that of 8-hydroxyquinoline, called "oxine". The applications of oxine in liquid-liquid extraction are limited because of its high solubility in acidic and alkaline aqueous solutions. By contrast, extractants according to the invention have hydrophobic substituents which replace one or more hydrogen atoms of the molecule. Such extractants have low solubility in acidic and alkaline aqueous solutions and give high distribution coefficients. The β-dodecenyl 8-hydroxyquinoline ($\beta oxH$) is an interesting oxine derivative because, among other interesting derivatives according to the invention, it is commercially available as Kelex 100 from Scherex. The 7-2-ethyl-hexyl-hydroxyquinoleine, available as Kelex 108 from Scherex, and the 7-undecyl-8-hydroxyquinolines, behave as βoxH.

EXAMPLE 1

Figure 3:
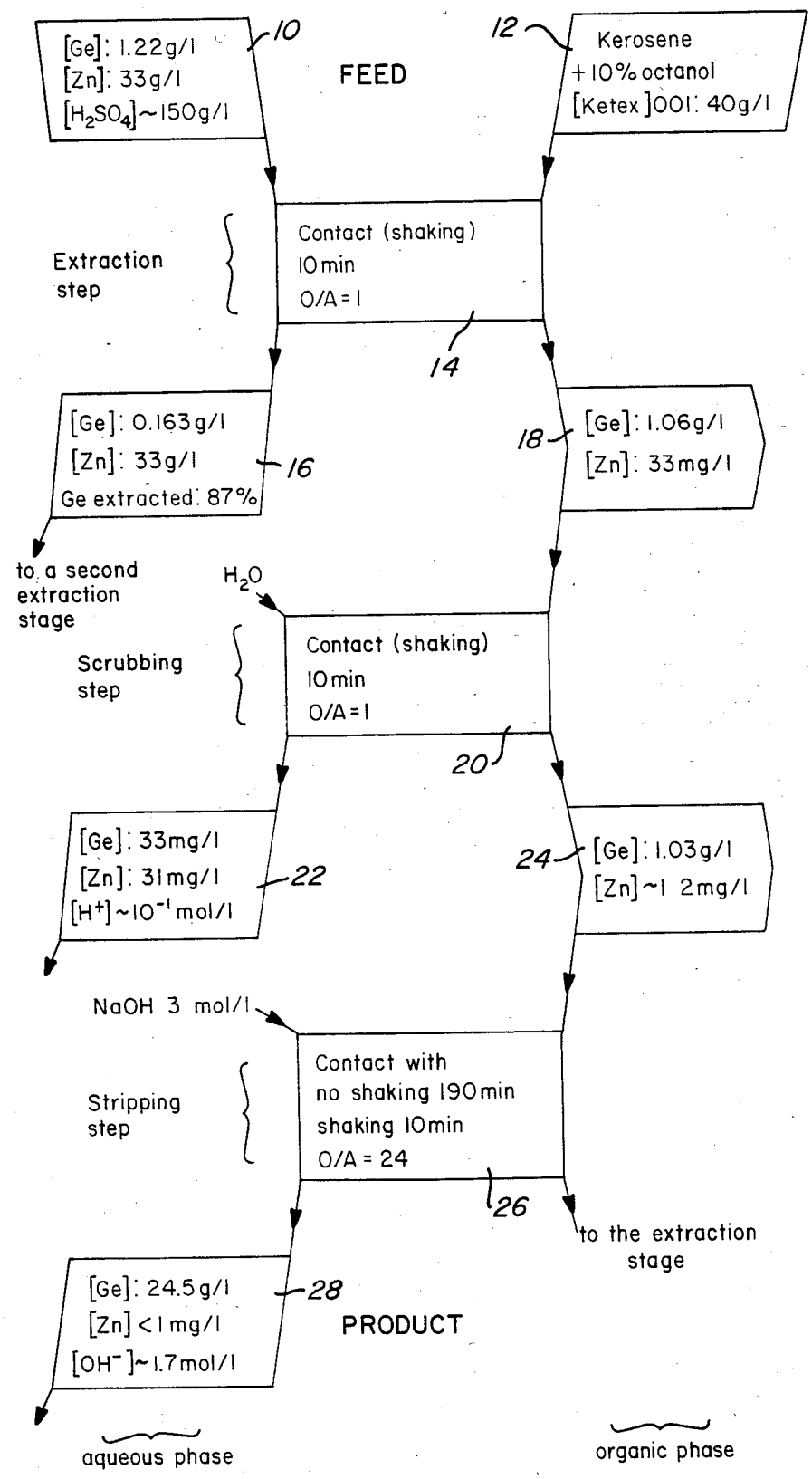
FIG. 3 is a diagram illustrating the main steps of a process according to the invention.

FIG. 3 is a diagram illustrating the main steps of a process according to the invention. The leach liquor contains essentially Zn (33 g/l) and $H_2SO_4$ (150 g/l) and a small amount of germanium (1.22 g/l). Said leach liquor 10 is contacted with an organic medium 12 containing, in a diluent comprising kerosene and 10% v/v of octanol, 40 g/l of Kelex 100 (-dodecenyl 8-hydroxyquinoline). The contacting step 14 between equal volumes of leach liquor and organic medium forms an aqueous phase 16, containing nearly all Zn and a small quantity of germanium, and an organic phase containing the greatest part of germanium (87%) and a very small portion of Zn. The aqueous phase is submitted to a second extraction stage. The organic phase 18 is contacted with water, in a scrubbing step 20, in equal volumes. Said scrubbing step forms an aqueous phase 22 containing the major part of Zn of the organic phase, with about all $H^+$. A small portion of Ge is also included in the aqueous phase. The organic phase 24 of the scrubbing step contains 83% of germanium from leach liquor and an insignificant amount of Zn. Said organic phase is contacted with NaOH in a stripping step 26 first without shaking (190 minutes) and after with shaking (10 minutes). The volume of the aqueous phase is smaller than that of organic phase (ratio of 24). Said stripping step forms an aqueous phase containing germanium and an organic phase containing the diluent which may be used for the extraction step.

In another example, the leach liquor 10 contained 1.15 g/l of Ge and 47.8 g of Zn, with 145 g/l of $H_2SO_4$, said organic medium 12 being the same as in preceding example. Contact time was 10 minutes in step 14. The organic phase contained 1.10 g/l of Ge and the aqueous one less than 0.050 g/l of Ge (extraction >95%). Subsequent stripping by NaOH 3 N gave a re-extraction greater than 99% (with shaking).

EXAMPLE 2

Dependance of the extraction on the acidity

A solution of zinc sulphate containing 119 mg/l of germanium and having various acidities is contacted during 15 minutes with an organic solution containing: Kelex 5%, Octanol 10%, Hexol D 100 85%. The results of the extraction are summarized in the following table.

| Acidity O/A | 0.42 N | 0.6 N | 0.76 N | 0.84 N | 1.1 N | 1.5 N | 2 N |
|---|---|---|---|---|---|---|---|
| 1 | 75.6% | — | — | — | — | — | — |
| 0.5 | 54.6% | 87.6% | 98.6% | 98.3% | 98.6% | 98.2% | 99.4% |
| 0.2 | — | — | 56.7% | 63.4% | — | 92.2% | 99.1% |
| 0.1 | — | — | 36.3% | 43.9% | — | 89.2% | 95.6% |

Extraction yields %

EXAMPLE 3

Stripping by Hydrofluoric Acid

An organic phase loaded with germanium is agitated with hydrofluoric acid containing 2% of hydrofluoric acid during 15 minutes with a ratio organic phase towards aqueous phase equal to 1. At ambient temperature, the yield is rather low, i.e. 15%. At 50° C., the yield is about 87%.

EXAMPLE 4

Action of the temperature on the stripping

The stripping depends on the temperature and on the agitation. The table A shows clearly that heating is necessary for a quick stripping. In this example the stripping was studied at various temperatures, with agitation during 15 minutes and keeping the contact without stirring during 24 hours. The stripping solution in all the following tests was sodium hydroxide 3 N.

TABLE A

| | Germanium g/l (aqueous phase) | | |
|---|---|---|---|
| Time | 20° C. | 35° C. | 50° C. |
| 30 minutes | 0.34 | 0.39 | 0.48 |
| 1 hour | 0.34 | 0.39 | 0.48 |
| 2 h 30 | 0.34 | 0.38 | 0.58 |
| 5 hours | 0.36 | 0.49 | 0.58 |
| 6 h 30 | 0.38 | 0.54 | 0.59 |
| 21 h 30 | 0.58 | 0.58 | 0.60 |
| 24 hours | 0.60 | 0.60 | 0.63 |

The following table, Table B, summarizes the results of the stripping at various temperatures, but in this case, the stirring was permanent. The initial concentration of the organic phase in germanium was 0.6 g/l. The stripping is much quicker.

TABLE B

| Time | | | Germanium g/l (aqueous phase) | | |
|---|---|---|---|---|---|
| 22° C. | 40° C. | 50° C. | 22° C. | 40° C. | 50° C. |
| 30 mn | 15 mn | 30 mn | 0.14 | 0.56 | 0.61 |
| 1 h 30 | 30 mn | 1 h | 0.56 | 0.59 | 0.63 |
| 3 h 15 | 1 h | 1 h 30 | 0.62 | 0.59 | 0.63 |
| 5 h 30 | 1 h 30 | 2 h | 0.63 | 0.60 | 0.65 |
| 9 h | 3 h | 3 h | 0.67 | 0.61 | 0.71 |
| 21 h 30 | 4 h | 3 h 30 | 0.70 | 0.64 | 0.74 |
| | 6 h | 5 h | | 0.63 | 0.79 |
| | 21 h 30 | 6 h 30 | | 0.64 | 0.80 |

The following table, Table C, shows that at 60° C. with stirring, the stripping is complete in less than 30 minutes, the initial germanium content of the organic phase being 1.2 g/l. The ratio organic phase to aqueous phase is equal to 1.

TABLE C

| Time in minutes | Germanium g/l |
|---|---|
| 2 | 0.93 |
| 7 | 1.00 |
| 12 | 1.15 |
| 17 | 1.18 |
| 22 | 1.17 |
| 27 | 1.18 |

EXAMPLE 5

Germanium extraction by resin

The resin used is a resin produced by Bayer and containing about 300 grams of βoxH by liter of resin (no octanol). The parameters of the example are following.

The volume of the bed is 18 ml. The flow-rate is 4.4 bv/h. The washing is done with sulphuric acid 0.5 M. The stripping is performed with sodium hydroxide 3 N. Some attemps of stripping with hydrochloric acid have been done. The results of these tests are summarized in the following table.

| Initial solution | | | | Stripping | | | |
| --- | --- | --- | --- | --- | --- | --- | --- |
| Ge in g/l | H+ N | Ge fixed bv | mg | NaOH 3N at 50° C. | yield % | HCL Ge mg | yield % |
| 1.00 | 3 | 17 | 122.50 | cold 27.5 | 22.4 | | |
| | | | | 50° C. 60.0 | 43.0 | | |
| 1.30 | 3 | 11 | 85.00 | 30.0 | 35.3 | 5N 48.75 | 57.5 |
| 1.15 | 3 | 14 | 72.00 | 68.0 | 94.5 | | |
| 0.119 | 0.42 | 70 | 37.50 | 40.0 | 98 | | |
| 0.119 | 1.4 | 40 | 48.20 | 51.7 | 98 | | |
| 0.119 | 1.4 | 44 | 50.00 | | | 8 N traces HF 2% | 95 |
| 0.119 | 1.4 | 35 | 50.70 | 39.20 | 77.3 | | |

EXAMPLE 6

Preparation of resin

The resin is prepared according to the following way. The starting material is a polystyrenic or polyester macroporous resin without functionnal groups, e.g. AMBERLITE XAD.7.

The resin is washed with 95° alcohol, with HCl 1 N and then with water until complete elimination of chloride ion. The resin is then dryed at 110° C. until its weight remains constant.

A solution of βoxH is prepared in such a way that the total volume of the solution is sufficient to completely cover the resin, that the concentration in βoxH corresponds to the weight desired, e.g. 30% of the resin weight; this corresponds generally to concentration of 10 to 50%. The diluent is preferably n-heptane.

The resin and the solution are mixed and the suspension is conditioned under vacuum to remove the gases contained in the resin and to facilitate the introduction of βoxH.

The diluent, heptane, is evaporated. New amount of heptane is added and again evaporated. The resin obtained is submitted to a temperature of 110° C. during a night. The resin thus obtained is contacted with acidic solution and is ready for use and gives similar results to the resin provided by Bayer.

According to the same preparation, it is possible to produce mixture of Kelex and polar liposoluble compounds.

Obviously, the invention is not limited to the treatment of leach liquors. Another specific application is the extraction of germanium from speiss. Said extraction is selective for germanium against iron and arsenic.

We claim:

1. A process for selective liquid-liquid extraction of germanium from an aqueous acidic liquor containing, besides germanium, at least one other metal selected from the group consisting of cadmium, cobalt, iron, arsenic, zinc and nickel, said process comprising,
   adjusting the pH of said aqueous acidic liquor to a value lower than 2 before extracting germanium from said aqueous liquor,
   extracting germanium from said aqueous acidic liquor by contacting said liquor with an organic medium which contains a diluent and an extractant, said diluent being immiscible with said aqueous acidic liquor, said extractant being an oxine derivative having a long hydrocarbon chain containing 8 to 16 carbon atoms, said extracting step forming an aqueous phase containing the major part of said at least one other metal and an organic phase containing the major part of germanium from said aqueous acidic liquor, and
   stripping germanium from said organic phase by contacting said phase with an alkaline medium having a pH greater than about 13, said alkaline medium and said organic phase having a temperature during said stripping step of at least about 40° C., said stripping step forming an aqueous liquor and an organic phase containing said diluent and said extractant.

2. Process according to claim 1, wherein the long hydrocarbon chain of said extractant includes at least one ethylenical unsaturation.

3. Process according to claim 1, wherein said extractant is β-dodecenyl-8-hydroxyquinoline.

4. Process according to claim 1, wherein said adjusting of the pH includes addition of sulphuric acid.

5. Process according to claim 1, wherein said diluent is selected from the group consisting of pure and mixed aliphatic compounds and petroleum fractions.

6. Process according to claim 5, wherein said diluent contains also a minor portion of at least one compound selected from the group consisting of alcohols and phenols.

7. Process according to claim 1, wherein said alkaline medium is NaOH.

8. Process according to claim 1, wherein said pH is between about 13 and 14.7.

9. Process according to claim 1, wherein the concentration of extractant in the organic medium is such that there are at least 4 moles of extractant for 1 mole of germanium in said aqueous acidic liquor.

10. Process according to claim 9, wherein said extractant is β-dodecenyl-8-hydroxyquinoline, said diluent is kerosene containing a minor portion of octanol and said aqueous acidic liquor is an acidic leach liquor containing zinc.

11. Process according to claim 1, wherein the diluent is a resin.

12. A process for solid-liquid extraction of germanium for an aqueous acidic liquor containing germanium and at least one other metal, said process comprising:
   (a) adjusting the pH of said aqueous acidic liquor to a value lower than 2 before extracting germanium from said aqueous acidic liquor,
   (b) extracting germanium from said aqueous acidic liquor by contacting said liquor with an organic solid medium which contains an oxine derivative having a long hydrocarbon chain containing 8 to 16 carbon atoms, said extractant being adsorbed onto a solid support, and
   (c) stripping germanium from said solid phase by contacting said phase with an aqueous medium selected from the group consisting of hydrochloric acid, hydrofluoric acid and an alkaline medium.

13. Process according to claim 12, wherein in step (a) the pH is adjusted to a value between about 0.5 and 1.5.

14. Process according to claim 12, wherein the oxine derivative is co-adsorbed with polar liposoluble compounds.

15. Process according to claim 12, wherein the stripping medium is hydrochloric acid having a concentration between about 6 and 10 N.

16. Process according to claim 12, wherein the proportion of said polar liposoluble compounds is at most about 50%.

17. A process for selective solid-liquid extraction of germanium from an aqueous acidic liquor containing, besides germanium, at least one other metal selected from the group consisting of cadmium, zinc, cobalt, iron, arsenic and nickel, said process comprising, adjusting the pH of said aqueous acidic liquor to a value lower than 2 before extracting germanium from said aqueous liquor, extracting germanium from said aqueous acidic liquor by contacting said liquor with an organic solid medium which contains an oxine derivative having a long hydrocarbon chain containing 8 to 16 carbon atoms, said extractant being adsorbed onto a solid support, said extracting step forming an aqueous phase containing the major part of said at least one other metal and an organic solid phase containing the major part of germanium from said aqueous acidic liquor, and stripping germanium from said organic solid phase by contacting said phase with a aqueous stripping medium.

18. Process according to claim 17, wherein said stripping medium is selected from the group consisting of hydrochloric acid, hydrofluoric acid and alkaline medium.

19. Process according to claim 17, wherein said stripping step forms an aqueous phase containing the major part of germanium from said aqueous liquor and an organic solid phase containing said oxine extractant.

20. Process according to claim 17, wherein said stripping is conducted at a temperature of at least about 40° C.

21. Process according to claim 17, wherein the long hydrocarbon chain of said extractant includes at least one ethylenical unsaturation.

22. Process according to claim 17, wherein said extractant is β-dodecenyl-8-hydroxyquinoline.

* * * * *